United States Patent
Hyakudai et al.

(10) Patent No.: US 10,791,349 B2
(45) Date of Patent: Sep. 29, 2020

(54) FRAME GENERATION APPARATUS, FRAME GENERATION METHOD, IMAGE SYNTHESIS APPARATUS, IMAGE SYNTHESIS METHOD, SIGNAL GENERATION APPARATUS, SIGNAL GENERATION METHOD, AND IMAGE TRANSMISSION SYSTEM

(71) Applicant: SONY CORPORATION, Tokyo (JP)

(72) Inventors: Toshihisa Hyakudai, Kanagawa (JP); Kazuaki Toba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 160 days.

(21) Appl. No.: 15/774,728

(22) PCT Filed: Aug. 18, 2016

(86) PCT No.: PCT/JP2016/074158
§ 371 (c)(1),
(2) Date: May 9, 2018

(87) PCT Pub. No.: WO2017/090283
PCT Pub. Date: Jun. 1, 2017

(65) Prior Publication Data
US 2018/0324468 A1    Nov. 8, 2018

(30) Foreign Application Priority Data
Nov. 26, 2015 (JP) .................................. 2015-230361

(51) Int. Cl.
*H04N 21/236* (2011.01)
*H04N 7/015* (2006.01)
(Continued)

(52) U.S. Cl.
CPC .......... *H04N 21/236* (2013.01); *G09G 5/005* (2013.01); *G09G 5/006* (2013.01); *H04N 7/015* (2013.01);
(Continued)

(58) Field of Classification Search
None
See application file for complete search history.

(56) References Cited

U.S. PATENT DOCUMENTS 6,744,929 B1  6/2004 Okada
2005/0105807 A1* 5/2005 Suino .................. H04N 19/176
382/232
(Continued)

FOREIGN PATENT DOCUMENTS

CN  101627633 A  1/2010
CN  104284205 A  1/2015
(Continued)

OTHER PUBLICATIONS

International Search Report and Written Opinion of PCT Application No. PCT/JP2016/074158, dated Oct. 25, 2016, 09 pages of ISRWO.

*Primary Examiner* — Christopher Braniff
(74) *Attorney, Agent, or Firm* — Chip Law Group (57) ABSTRACT

Provided is a frame generation apparatus including an image division section that divides a video signal into high-order bits and low-order bits for each pixel element, a frame generation section that generates a first frame including the high-order bits and a second frame including the low-order bits and a transmission operation control section that causes an operation of a transmission section of transmitting the second frame to a receiver to stop in a case where information regarding the receiver is prescribed information.

20 Claims, 7 Drawing Sheets

(51) Int. Cl.
*H04N 21/434* (2011.01)
*G09G 5/00* (2006.01)
*H04N 19/00* (2014.01)

(52) U.S. Cl.
CPC ..... *H04N 21/23602* (2013.01); *H04N 21/434* (2013.01); *G09G 2330/021* (2013.01); *G09G 2350/00* (2013.01); *G09G 2370/00* (2013.01); *G09G 2370/04* (2013.01); *G09G 2370/042* (2013.01); *H04N 19/00* (2013.01)

(56) References Cited

U.S. PATENT DOCUMENTS

2009/0241147 A1   9/2009  Kim et al.
2015/0016538 A1*  1/2015  Yamashita ............ H04N 7/015
                                              375/240.24

FOREIGN PATENT DOCUMENTS

| JP | 2000-244744 A | 9/2000 |
| JP | 2005-094578 A | 4/2005 |
| JP | 2006-041859 A | 2/2006 |
| JP | 2010-518653 A | 5/2010 |
| JP | 2015-019182 A | 1/2015 |
| WO | 2008/030032 A2 | 3/2008 |

\* cited by examiner

FRAME GENERATION APPARATUS, FRAME GENERATION METHOD, IMAGE SYNTHESIS APPARATUS, IMAGE SYNTHESIS METHOD, SIGNAL GENERATION APPARATUS, SIGNAL GENERATION METHOD, AND IMAGE TRANSMISSION SYSTEM

CROSS REFERENCE TO RELATED APPLICATIONS

This application is a U.S. National Phase of International Patent Application No. PCT/JP2016/074158 filed on Aug. 18, 2016 which claims priority benefit of Japanese Patent Application No. JP 2015-230361 filed in the Japan Patent Office on Nov. 26, 2015. Each of the above-referenced applications is hereby incorporated herein by reference in its entirety.

TECHNICAL FIELD

The present disclosure relates to a frame generation apparatus, a frame generation method, an image synthesis apparatus, an image synthesis method, a signal generation apparatus, a signal generation method, and an image transmission system.

BACKGROUND ART

These days, the amount of information of a video signal is dramatically improved, and an ultra-high resolution, ultra-high gradation baseband video signal is coming into wide use. For example, Super Hi-Vision, in which the number of effective pixels is 7680×4320 and the number of bits of each pixel element (R, G, or B, or Y, Cb, or Cr) of one pixel is 10 or 12, is promoted. Further, also further expansion of the dynamic range of a video image in the future is studied as seen in HDR, and it is also expected that a video signal in which the number of bits of each pixel element of one pixel is more than 12 (for example, the number of bits of each pixel element of one pixel is 16 or 24) will be handled.

For example, as a technology to transmit an ultra-high gradation video signal, a technology in which an ultra-high gradation video signal is transmitted using a plurality of 3G-SDI transmission paths is disclosed (for example, see Patent Literature 1). This Patent Literature 1 proposes, in a case where the number of bits of each pixel element is 16, dividing each pixel element into high-order 8 bits and low-order 8 bits and transmitting the high-order 8 bits and the low-order 8 bits while assigning these bits to different SG-SDI transmission paths. A reception apparatus receives these divided high-order 8 bits and low-order 8 bits using a plurality of transmission paths, synthesizes the pixel element divided in the high-order 8 bits and the low-order 8 bits, and reproduces an ultra-high gradation video signal.

CITATION LIST

Patent Literature

Patent Literature 1: JP 2015-019182A

DISCLOSURE OF INVENTION

Technical Problem

However, there may be a case where an ultra-high gradation video image is not handled by a receiver. As an example, there may be a case where tablet devices, mobile devices, and the like, of which the frequency of use is expected to continue to increase, cannot handle an ultra-high gradation video image, due to limitations on their throughput and power consumption, etc. Further, as another example, there may be a case where a video signal that a receiver displays does not need a considerable amount of information, in terms of the properties of the receiver. If, even in such a case, ultra-high gradation video images continue to be transmitted as they are or ultra-high gradation video images continue to be received as they are, wasteful power consumption is required.

Thus, it is desired to provide a technology by which, in a case where a video signal is divided and transmitted from a transmitter to a receiver via a plurality of transmission paths, the power consumption required by at least either one of the transmitter and the receiver can be reduced.

Solution to Problem

According to the present disclosure, there is provided a frame generation apparatus including: an image division section configured to divide a video signal into high-order bits and low-order bits for each pixel element; a frame generation section configured to generate a first frame including the high-order bits and a second frame including the low-order bits; and a transmission operation control section configured to cause an operation of a transmission section of transmitting the second frame to a receiver to stop in a case where information regarding the receiver is prescribed information.

According to the present disclosure, there is provided a frame generation method including: dividing a video signal into high-order bits and low-order bits for each pixel element; generating a first frame including the high-order bits and a second frame including the low-order bits; and causing an operation of a transmission section of transmitting the second frame to a receiver to stop in a case where information regarding the receiver is prescribed information.

According to the present disclosure, there is provided an image synthesis apparatus including: a pixel extraction section configured to extract high-order bits and low-order bits from, respectively, a first frame and a second frame including, respectively, the high-order bits and the low-order bits that are obtained by a video signal to be received by a receiver being divided for each pixel element in a case where the first frame and the second frame are received from a transmitter; an image synthesis section configured to synthesize the high-order bits and the low-order bits to restore the video signal; and a reception operation control section configured to make control so as to stop an operation of a reception section of receiving the second frame from the transmitter in a case where information regarding the receiver is prescribed information.

According to the present disclosure, there is provided an image synthesis method including: extracting high-order bits and low-order bits from, respectively, a first frame and a second frame including, respectively, the high-order bits and the low-order bits that are obtained by a video signal to be received by a receiver being divided for each pixel element in a case where the first frame and the second frame are received from a transmitter; an image synthesis section configured to synthesize the high-order bits and the low-order bits to restore the video signal; and making control so as to stop an operation of a reception section of receiving the second frame from the transmitter in a case where information regarding the receiver is prescribed information.

According to the present disclosure, there is provided a signal generation apparatus including: a pixel extraction section configured to extract high-order bits from a first frame including the high-order bits that are obtained by a video signal to be received by a receiver being divided for each pixel element in a case where the first frame is received from a transmitter; and a signal generation section configured to generate a video signal with a smaller size than the video signal on a basis of the high-order bits.

According to the present disclosure, there is provided an image transmission system including: a frame generation apparatus including an image division section configured to divide a video signal into high-order bits and low-order bits for each pixel element, a frame generation section configured to generate a first frame including the high-order bits and a second frame including the low-order bits, and a transmission operation control section configured to cause an operation of a transmission section of transmitting the second frame to a receiver to stop in a case where information regarding the receiver is prescribed information; and an image synthesis apparatus including a pixel extraction section configured to extract the high-order bits and the low-order bits from the first frame and the second frame, respectively, in a case where the first frame and the second frame are received from a transmitter, an image synthesis section configured to synthesize the high-order bits and the low-order bits to restore the video signal, and a reception operation control section configured to make control so as to stop an operation of a reception section of receiving the second frame from the transmitter in a case where information regarding the receiver is prescribed information.

Advantageous Effects of Invention

As described above, according to the present disclosure, a technology by which, in a case where a video signal is divided and transmitted from a transmitter to a receiver via a plurality of transmission paths, the power consumption required by at least either one of the transmitter and the receiver can be reduced is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the present specification and the drawings, a plurality of components having substantially the same functional configuration are distinguished by marking different numerals after the same reference character. However, in a case where it is not necessary to particularly distinguish each of a plurality of components having substantially the same functional configuration and the like, they are marked with only the same reference character. Further, like components of different embodiments are distinguished by marking different alphabet letters after the same reference character.

Note that the description is given in the following order.
1. Background
2. Configurational example of image transmission system
3. Conclusions

1. BACKGROUND

First, the background of the present embodiment is described. These days, the amount of information of a video signal is dramatically improved, and an ultra-high resolution, ultra-high gradation baseband video signal is coming into wide use. For example, Super Hi-Vision, in which the number of effective pixels is 7680×4320 and the number of bits of each pixel element (R, G, or B, or Y, Cb, or Cr) of one pixel is 10 or 12, is promoted. Further, also further expansion of the dynamic range of a video image in the future is studied as seen in HDR, and it is also expected that a video signal in which the number of bits of each pixel element of one pixel is more than 12 (for example, the number of bits of each pixel element of one pixel is 16 or 24) will be handled.

Figure 1:
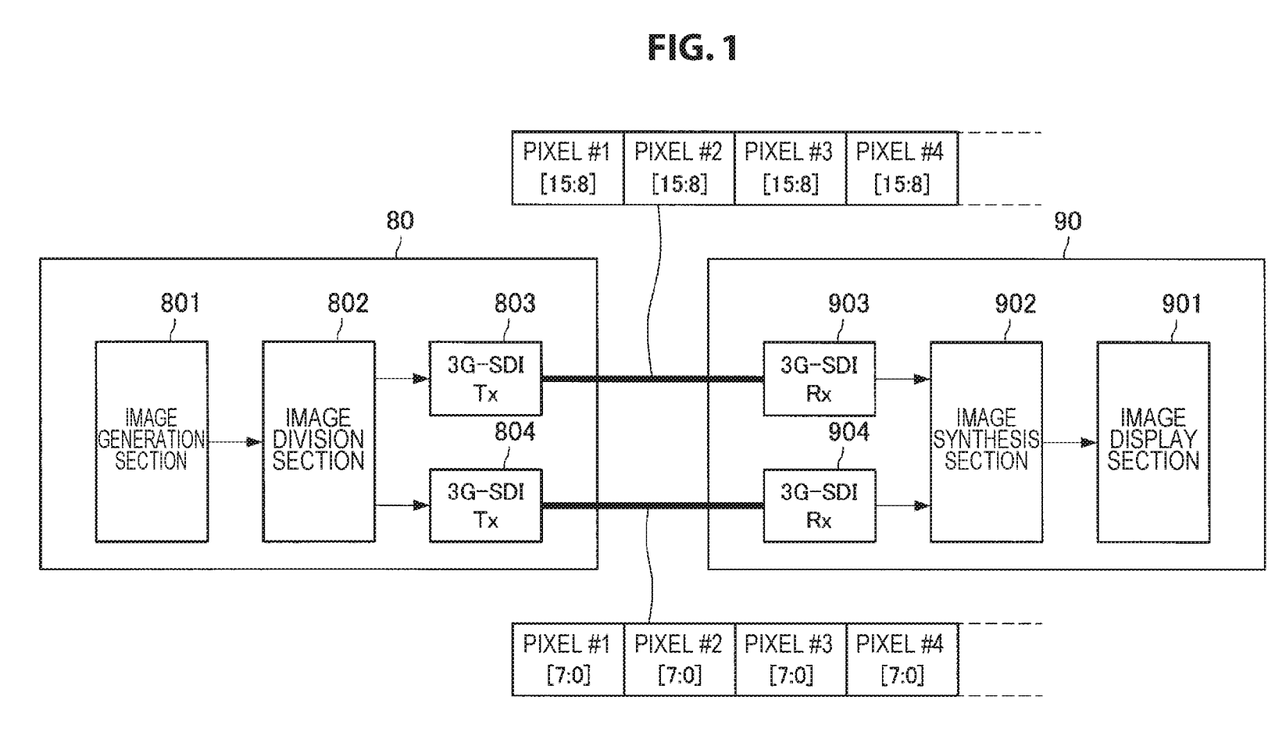
FIG. 1 is a diagram showing a configurational example of an ordinary system that transmits an ultra-high gradation video signal.

For example, as a technology to transmit an ultra-high gradation video signal, a technology in which an ultra-high gradation video signal is transmitted using a plurality of 3G-SDI transmission paths is disclosed (for example, see JP 2015-019182A). FIG. 1 is a diagram showing a configurational example of an ordinary system that transmits an ultra-high gradation video signal. As shown in FIG. 1, the ordinary system that transmits an ultra-high gradation video signal includes a transmitter 80 and a receiver 90, and the transmitter 80 includes an image generation section 801, an image division section 802, a 3G-SDI transmission section 803, and a 3G-SDI transmission section 804. Further, the receiver 90 includes a 3G-SDI reception section 903, a 3G-SDI reception section 904, an image synthesis section 902, and an image display section 901.

In the transmitter 80, the image generation section 801 generates a video signal in which the number of bits of each pixel element is 16. The image division section 802 divides each pixel element of the video signal into high-order 8 bits and low-order 8 bits. The 3G-SDI transmission section 803 transmits the high-order 8 bits to the receiver 90, and the 3G-SDI transmission section 804 transmits the low-order 8 bits to the receiver 90. Subsequently, in the receiver 90, the 3G-SDI reception section 903 receives the high-order 8 bits and the 3G-SDI reception section 904 receives the low-order 8 bits, the image synthesis section 902 synthesizes the high-order 8 bits and the low-order 8 bits to restore an ultra-high gradation video signal, and the image display section 901 reproduces and displays the ultra-high gradation video signal.

However, there may be a case where an ultra-high gradation video image is not handled by the receiver 90. As an example, there may be a case where tablet devices, mobile devices, and the like, of which the frequency of use is expected to continue to increase, cannot handle an ultra-high gradation video images, due to limitations on their throughput and power consumption, etc. Further, as another example, there may be a case where a video signal that the receiver 90 displays does not need a considerable amount of information, in terms of the properties of the receiver 90. If, even in such a case, ultra-high gradation video images continue to be transmitted as they are or ultra-high gradation video images continue to be received as they are, wasteful power consumption is required.

Thus, the present specification mainly proposes a technology by which, in a case where a video signal is divided and transmitted from the transmitter 80 to the receiver 90 via a plurality of transmission paths, the power consumption required by at least either one of the transmitter 80 and the receiver 90 can be reduced. Note that, in the present specification, an ultra-high gradation video image is envisaged as the video signal transmitted from the transmitter 80 to the receiver 90, and a case where the number of bits of each pixel element is more than or equal to 16 and less than or equal to 24 is envisaged. However, the number of bits of each pixel element is not particularly limited.

Hereinabove, the background of the present embodiment is described.

2. CONFIGURATIONAL EXAMPLE OF IMAGE TRANSMISSION SYSTEM

Figure 2:
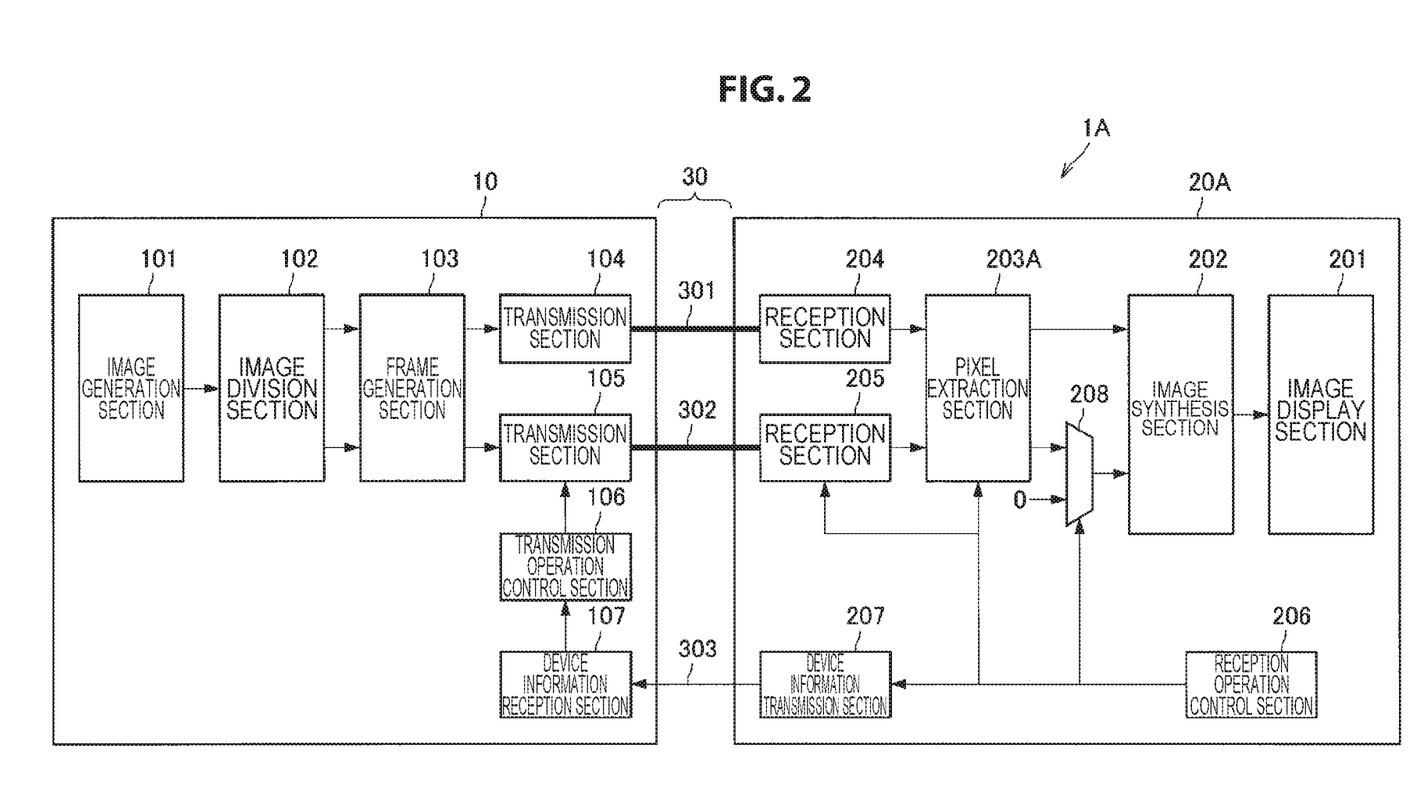
FIG. 2 is a diagram showing an example of a configuration of an image transmission system according to an embodiment of the present disclosure.

Next, a configurational example of an image transmission system is described with reference to FIG. 2. FIG. 2 is a diagram showing an example of the configuration of an image transmission system according to the present embodiment. As shown in FIG. 2, an image transmission system 1A according to the present embodiment includes a transmitter 10 and a receiver 20A. The transmitter 10 and the receiver 20A are connected together via a cable 30. The cable 30 includes a plurality of transmission paths. Note that the transmitter 10 can function as a "frame generation apparatus." Further, the receiver 20A can function as an "image synthesis apparatus."

The transmitter 10 includes an image generation section 101, an image division section 102, a frame generation section 103, a transmission section 104, a transmission section 105, a transmission operation control section 106, and a device information reception section 107. The image generation section 101 generates a video signal. Note that, although FIG. 2 shows an example in which the image generation section 101 is incorporated in the transmitter 10, the image generation section 101 may exist outside the transmitter 10.

Figure 3:
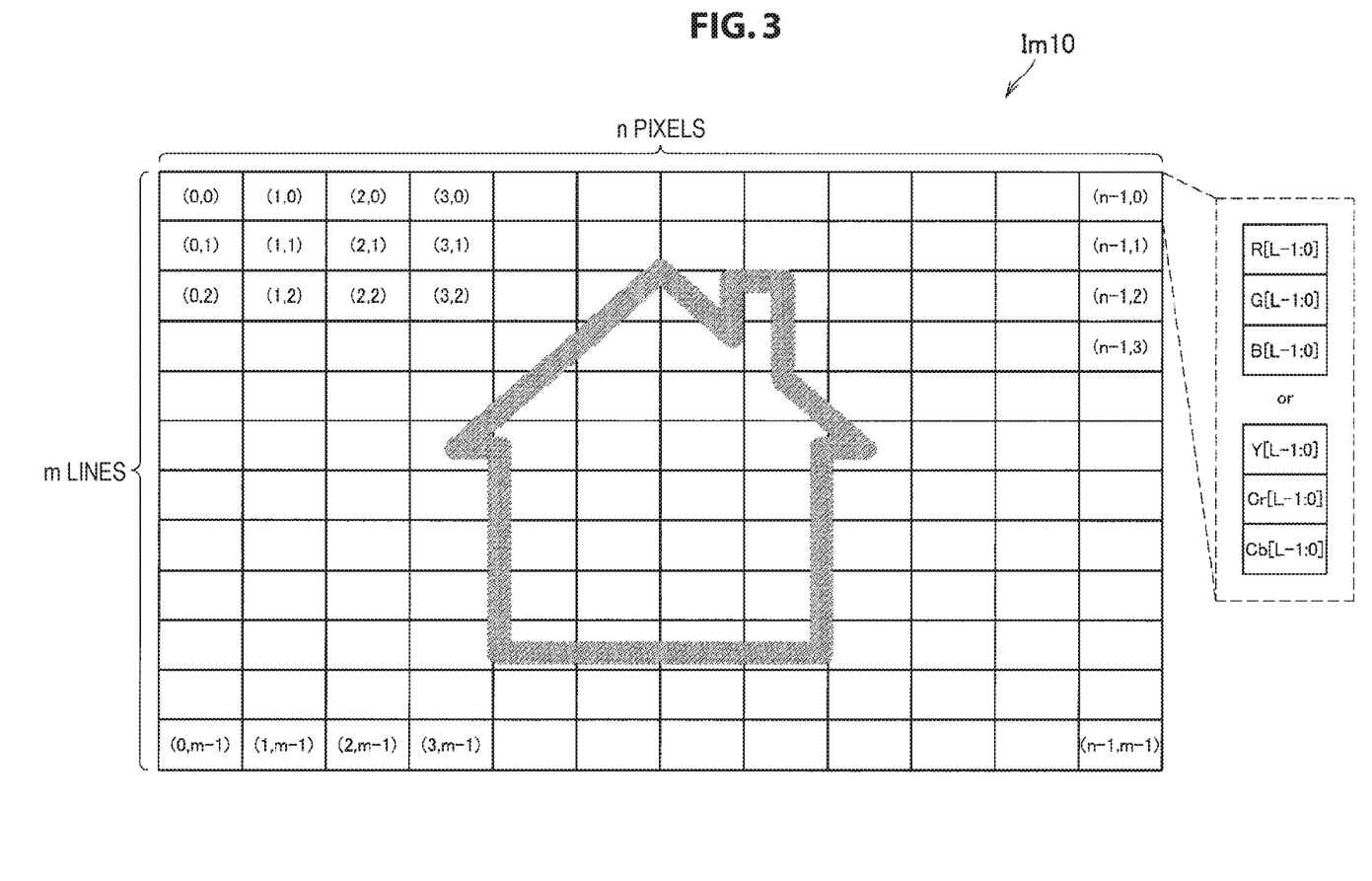
FIG. 3 is a diagram showing an example of a video signal according to the embodiment.

FIG. 3 is a diagram showing an example of a video signal according to the present embodiment. As shown in FIG. 3, the number of pixels in the horizontal direction in a video signal Im10 is denoted by n, and the number of lines in the vertical direction in the video signal Im10 is denoted by m. That is, the pixel number in the horizontal direction in the video signal Im10 is set to integers of 0 to n−1, and the line number in the vertical direction in the video signal Im10 is set to integers of 0 to m−1.

Further, as shown in FIG. 3, each pixel of the video signal Im10 includes pixel elements (R, G, and B) or pixel elements (Y, Cb, and Cr), and the number of bits of each pixel element is L (16≤L≤24). In the following, a case where each pixel of the video signal Im10 includes the pixel elements (R, G, and B) is mainly described. However, each pixel of the video signal Im10 is not limited to the pixel elements (R, G, and B), and may be the pixel elements (Y, Cb, and Cr).

The image division section 102 divides the video signal Im10 into high-order bits and low-order bits for each pixel element (R, G, or B). It is sufficient that the high-order bits have minimum data capable of bearing viewing in a case of being used for display, and the number of high-order bits is not particularly limited. Further, the low-order bits are the bits other than the high-order bits of the pixel element. A specific example will now be described with reference to FIG. 4.

Figure 4:
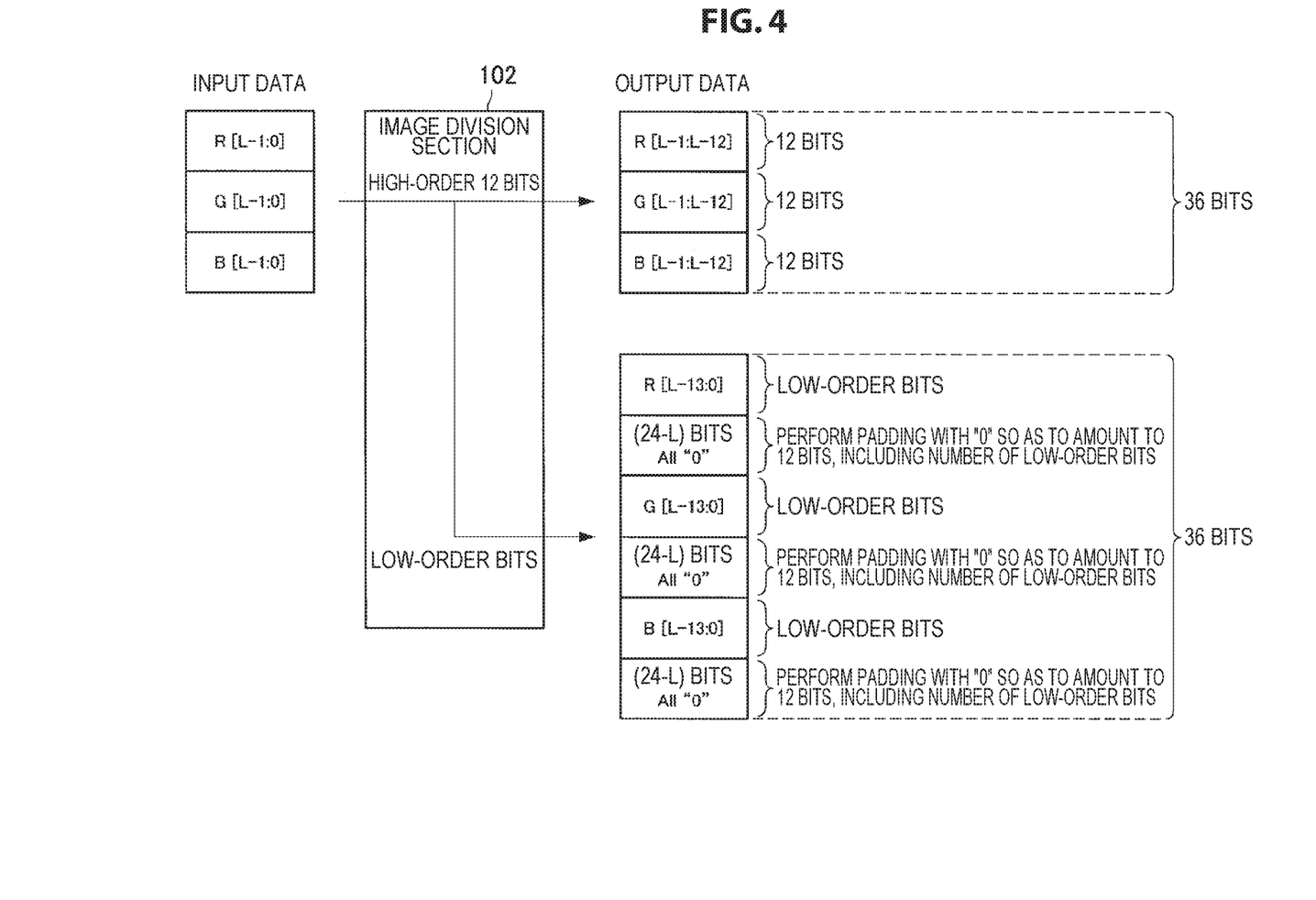
FIG. 4 is a diagram for describing an example of a technique of dividing a video signal into high-order bits and low-order bits for each pixel element (R, G, or B).

FIG. 4 is a diagram for describing an example of a technique of dividing the video signal Im10 into high-order bits and low-order bits for each pixel element (R, G, or B). The image division section 102 outputs high-order 12 bits of each pixel element (R, G, or B) (a total of 36 bits) to the frame generation section 103. On the other hand, the image division section 102 outputs low-order bits of each pixel element (R, G, or B) to the frame generation section 103. In this event, in a case where there is a set of low-order bits that does not reach 12 bits, the image division section 102 puts in 0 until reaching 12 bits, and outputs a set of low-order bits that has reached 12 bits to the frame generation section 103.

Figure 5:
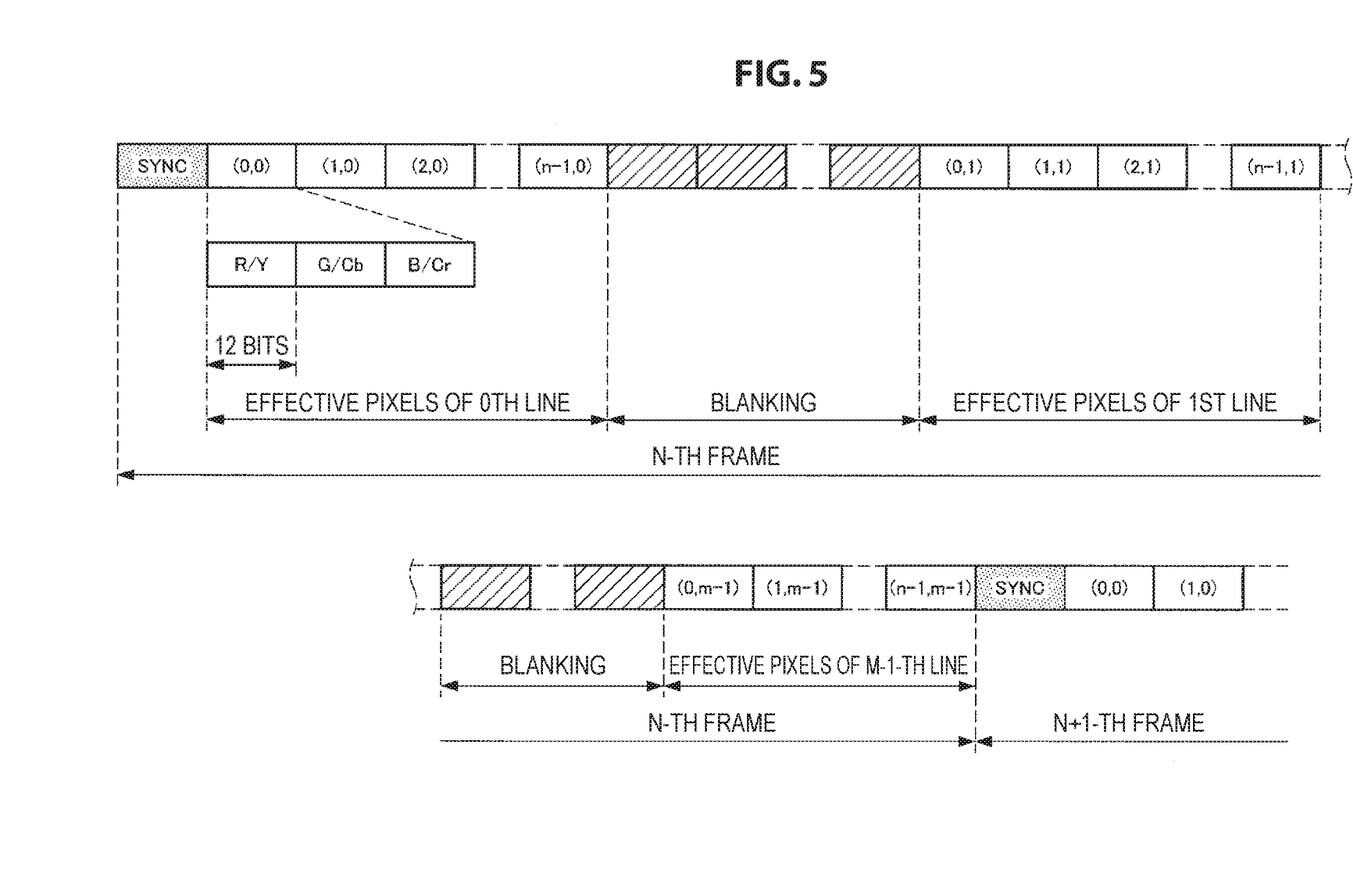
FIG. 5 is a diagram showing a configurational example of a frame (a first frame and a second frame) generated by a frame generation section.

The frame generation section 103 generates a first frame including the high-order bits and a second frame including the low-order bits. FIG. 5 is a diagram showing a configurational example of a frame (the first frame and the second frame) generated by the frame generation section 103. In FIG. 5, the whole of the N-th frame is shown as the N-th (N being an integer more than or equal to 0) frame, and a part of the N+1-th frame is shown as the N+1-th frame.

The frame generation section 103 generates a first frame that includes, in order, the high-order bits (12 bits) of each pixel element of the front-end line of the video signal Im10 (the 0th line in the video signal Im10), the high-order bits (12 bits) of each pixel element of the first line of the video signal Im10 (the 1st line in the video signal Im10), and the high-order bits (12 bits) of each pixel element of the lines following the above lines.

Further, the frame generation section 103 generates a second frame that includes, in order, the low-order bits (12 bits) of each pixel element of the front-end line of the video signal Im10 (the 0th line in the video signal Im10), the low-order bits (12 bits) of each pixel element of the first line of the video signal Im10 (the 1st line in the video signal Im10), and the low-order bits (12 bits) of each pixel element of the lines following the above lines.

Further, as shown in FIG. 5, the frame generation section 103 marks a frame start identifier (SYNC) on the head of the frame (the first frame and the second frame). Any one of prescribed codes at least not existing in the video signal (hereinafter, occasionally referred to as "special data") is assigned to the frame start identifier. For example, the special data depend on the encoding of data transmitted and received through a transmission path 301 and a transmission path 302. For example, in a case where ANSI 8b/10b conversion is used for the encoding of data transmitted and received through the transmission path 301 and the transmission path 302, a K code may be assigned to the special data. For example, data in which a K code called K28.5 (0xBC) appears consecutively N bytes may be assigned to the frame start identifier.

Further, a blanking section exists on the rear side of each line. Here, among the special data, special data different from the special data assigned to the frame start identifier are assigned to the blanking section.

Note that the frame generation section 103 may perform encoding on the frame (the first frame and the second frame). Specifically, the frame generation section 103 may perform 8b/10b encoding on the frame (the first frame and the second frame). For example, the frame generation section 103 may substitute the frame start identifier of the frame (the first frame and the second frame) with corresponding special data, substitute the blanking section with corresponding special data, and substitute data other than these with 10-bit-based data. Further, the frame generation section 103 may convert the encoded frame from parallel data to serial data in order to change the frame to a form suitable for high-speed transmission.

Further, although the example shown in FIG. 2 shows an example in which the generation of the first frame and the generation of the second frame are performed in the same frame generation section 103, the generation of the first frame and the generation of the second frame may be performed in different frame generation sections 103.

The transmission section 104 transmits the first frame to the receiver 20A via the cable 30. More specifically, the transmission section 104 transmits the first frame to the receiver 20A via the transmission path 301. For example, in a case where the transmission path 301 includes an optical fiber, the transmission section 104 transmits the first frame to the receiver 20A via the transmission path 301 after converting the first frame to an optical signal. However, the type of the signal transmitted from the transmitter 10 to the receiver 20A via the transmission path 301 is not limited. For example, the transmission section 104 may transmit the first frame to the receiver 20A via the transmission path 301 by means of an electrical signal.

Further, the transmission section 105 transmits the second frame to the receiver 20A via the cable 30. More specifically, the transmission section 105 transmits the second frame to the receiver 20A via the transmission path 302. For example, in a case where the transmission path 302 includes an optical fiber, the transmission section 105 transmits the second frame to the receiver 20A via the transmission path 302 after converting the second frame to an optical signal. However, the type of the signal transmitted from the transmitter 10 to the receiver 20A via the transmission path 301 is not limited. For example, the transmission section 105 may transmit the second frame to the receiver 20A via the transmission path 302 by means of an electrical signal.

The device information reception section 107 receives information regarding the receiver 20A from the receiver 20A via a transmission path 303. Then, in a case where the information regarding the receiver 20A is prescribed information, the transmission operation control section 106 causes the operation of the transmission section 105 of transmitting the second frame to the receiver 20A to stop. By such a configuration, the operation of the transmission section 105 is stopped in the case where the information regarding the receiver 20A is the prescribed information; thus, it becomes possible to reduce the power consumption required by the transmitter 10. On the other hand, in a case where the information regarding the receiver 20A is not the prescribed information, the operation of the transmission section 105 of transmitting the second frame to the receiver 20A is allowed to continue.

Here, in a case where the transmission path 303 includes an optical fiber, the device information reception section 107 receives, from the receiver 20A via the transmission path 303, information regarding the receiver 20A after being converted to an optical signal. However, the type of the signal transmitted from the receiver 20A to the transmitter 10 via the transmission path 303 is not limited. For example, the device information reception section 107 may receive the information regarding the receiver 20A from the transmitter 10 via the transmission path 303 by means of an electrical signal.

Further, the information regarding the receiver 20A is not particularly limited. For example, the information regarding the receiver 20A may include at least either one of a state of the receiver 20A and a function of the receiver 20A. For example, the information regarding the receiver 20A includes a state of the receiver 20A; and in a case where the state of the receiver 20A is a prescribed state, the transmission operation control section 106 may cause the operation of the transmission section 105 of transmitting the second frame to stop. The prescribed state is not limited as long as it is a state not using the low-order bits in the receiver 20A, and may be a low electric power mode.

Alternatively, the information regarding the receiver 20A includes a function of the receiver 20A; and in a case where the function of the receiver 20A is a prescribed function, the transmission operation control section 106 may cause the operation of the transmission section 105 of transmitting the second frame to stop. The prescribed function is not limited as long as it is a function not using the low-order bits in the receiver 20A, and may be a function of the number of receivable bits being below a threshold, may be a function of the number of connectable transmission paths being below a threshold, may be a function of being a mobile terminal, or may be a function of not having an ultra-high gradation mode.

Note that herein an example in which the transmission operation control section 106 causes the operation of the transmission section 105 of transmitting the second frame to the receiver 20A to stop in the case where the information regarding the receiver 20A is prescribed information is described. However, in the case where the information regarding the receiver 20A is prescribed information, the transmission operation control section 106 may control the frame generation section 103 so as to stop the generation of the second frame, instead of causing the operation of the transmission section 105 to stop, or in addition to causing the operation of the transmission section 105 to stop. By such a configuration, the operation of the frame generation section 103 is lessened in the case where the information regarding the receiver 20A is prescribed information; thus, it becomes possible to reduce the power consumption required by the transmitter 10.

The receiver 20A includes a reception section 204, a reception section 205, a reception operation control section 206, a device information transmission section 207, a pixel extraction section 203A, a multiplexer 208, an image synthesis section 202, and an image display section 201.

The reception section 204 receives the first frame via the cable 30. More specifically, the reception section 204 receives the first frame via the transmission path 301. For example, in a case where the transmission path 301 includes an optical fiber, the reception section 204 receives the light of the first frame that is transmitted by an optical signal from the transmitter 10, and converts the light to an electrical signal. However, as mentioned above, the type of the signal transmitted from the transmitter 10 to the receiver 20A via the transmission path 301 is not limited. For example, the reception section 204 may receive the first frame from the transmitter 10 via the transmission path 301 by means of an electrical signal.

The reception section 205 receives the second frame via the cable 30. More specifically, the reception section 205 receives the second frame transmitted from the transmission section 105, via the transmission path 302. For example, in a case where the transmission path 302 includes an optical fiber, the reception section 205 receives the light of the second frame that is transmitted by an optical signal from the transmitter 10, and converts the light to an electrical signal. However, as mentioned above, the type of the signal transmitted from the transmitter 10 to the receiver 20A via the transmission path 302 is not limited. For example, the reception section 205 may receive the second frame from the transmitter 10 via the transmission path 302 by means of an electrical signal.

In a case where the information regarding the receiver 20A is the prescribed information described above, the reception operation control section 206 makes control so as to stop the operation of the reception section 205 of receiving the second frame from the transmitter 10. By such a configuration, the operation of the reception section 205 is stopped in the case where the information regarding the receiver 20A is the prescribed information; thus, it becomes possible to reduce the power consumption required by the receiver 20A. On the other hand, in a case where the information regarding the receiver 20A is not the prescribed information, the operation of the reception section 205 of receiving the second frame from the transmitter 10 is allowed to continue.

The device information transmission section 207 transmits information regarding the receiver 20A to the transmitter 10 via the transmission path 303. Here, in a case where the transmission path 303 includes an optical fiber, the device information transmission section 207 converts the information regarding the receiver 20A to an optical signal, and transmits the optical signal to the transmitter 10 via the transmission path 303. However, the type of the signal transmitted from the receiver 20A to the transmitter 10 via the transmission path 303 is not limited. For example, the device information transmission section 207 may transmit the information regarding the receiver 20A to the transmitter 10 via the transmission path 303 by means of an electrical signal.

The pixel extraction section 203A extracts the high-order bits of each pixel element from the first frame received by the reception section 204. This will now be specifically described with reference to FIG. 5. Before extracting the high-order bits of each pixel element from the first frame, the pixel extraction section 203A may convert the first frame from serial data to parallel data, and may decode the first frame converted to parallel data. Specifically, the pixel extraction section 203A may perform 8b/10b decoding on the first frame.

For example, the pixel extraction section 203A may substitute, of the first frame, the special data corresponding to the frame start identifier with the frame start identifier, and substitute the special data corresponding to the blanking section with the blanking section. On the other hand, the pixel extraction section 203A may substitute also the remaining data of the first frame with 8-bit-based data.

Subsequently, the pixel extraction section 203A detects the frame start identifier (SYNC) from the first frame. Since the frame start identifier is marked on the head of the first frame, the pixel extraction section 203A may extract the high-order bits of each pixel element from the first frame on the basis of the position of the frame start identifier. More specifically, if the pixel extraction section 203A has grasped the relative position of the high-order bits of each pixel element with respect to the position of the frame start identifier as a reference, the pixel extraction section 203A may extract the high-order bits of each pixel element on the basis of this relative position.

Similarly, the pixel extraction section 203A extracts the low-order bits of each pixel element from the second frame received by the reception section 205. This will now be specifically described with reference to FIG. 5. Before extracting the low-order bits of each pixel element from the second frame, the pixel extraction section 203A may convert the second frame from serial data to parallel data, and may decode the second frame converted to parallel data. Specifically, the pixel extraction section 203A may perform 8b/10b decoding on the second frame.

For example, the pixel extraction section 203A may substitute, of the second frame, the special data corresponding to the frame start identifier with the frame start identifier, and substitute the special data corresponding to the blanking section with the blanking section. On the other hand, the pixel extraction section 203A may substitute also the remaining data of the second frame with 8-bit-based data.

Subsequently, the pixel extraction section 203A detects the frame start identifier (SYNC) from the second frame. Since the frame start identifier is marked on the head of the second frame, the pixel extraction section 203A may extract the low-order bits of each pixel element from the second frame on the basis of the position of the frame start identifier. More specifically, if the pixel extraction section 203A has grasped the relative position of the low-order bits of each pixel element with respect to the position of the frame start identifier as a reference, the pixel extraction section 203A may extract the low-order bits of each pixel element on the basis of this relative position.

Note that in the above an example in which the reception operation control section 206 causes the operation of the reception section 205 of receiving the second frame from the transmitter 10 to stop in the case where the information regarding the receiver 20A is prescribed information is described. However, in the case where the information regarding the receiver 20A is prescribed information, the reception operation control section 206 may control the pixel extraction section 203A so as to stop the extraction of the low-order bits of each pixel element, instead of causing the operation of the reception section 205 to stop, or in addition to causing the operation of the reception section 205 to stop. By such a configuration, the operation of the pixel extraction section 203A is lessened in the case where the information regarding the receiver 20A is prescribed information; thus, it becomes possible to reduce the power consumption required by the receiver 20A.

Further, although the example shown in FIG. 2 shows an example in which the extraction of the high-order bits of each pixel element and the extraction of the low-order bits of each pixel element are performed in the same pixel extraction section 203A, the extraction of the high-order bits of each pixel element and the extraction of the low-order bits of each pixel element may be performed in different pixel extraction sections 203A.

In a case where the information regarding the receiver 20A inputted from the reception operation control section 206 is prescribed information, the multiplexer 208 outputs "0" to the image synthesis section 202. On the other hand, in a case where the information regarding the receiver 20A inputted from the reception operation control section 206 is not the prescribed information, the multiplexer 208 outputs the low-order bits of each pixel element extracted by the pixel extraction section 203A to the image synthesis section 202.

Figure 6:
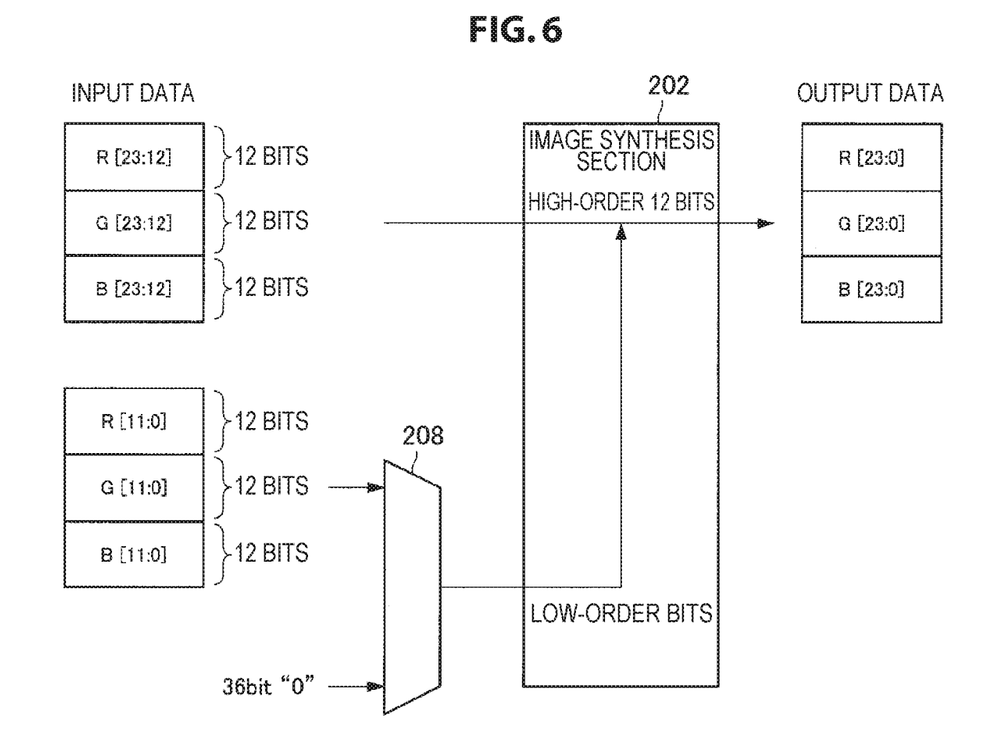
FIG. 6 is a diagram for describing an example of a technique of synthesizing high-order bits and low-order bits for each pixel element (R, G, or B) to restore a video signal.

The image synthesis section 202 synthesizes the high-order bits of each pixel element and the low-order bits of each pixel element to restore the video signal Im10. FIG. 6 is a diagram for describing an example of a technique of synthesizing the high-order bits and the low-order bits for each pixel element (R, G, or B) to restore the video signal Im10.

As shown in FIG. 6, in a case where the low-order bits of each pixel element (R, G, or B) are inputted from the multiplexer 208, the image synthesis section 202 synthesizes the high-order 12 bits of each pixel element (R, G, or B) (a total of 36 bits) and the low-order bits of each pixel element (R, G, or B) (a total of 36 bits), and outputs the result. The signal outputted in this event is, for example, a signal having the high-order bits and the low-order bits (an ultra-high gradation video signal).

On the other hand, in a case where "0" is inputted from the multiplexer 208, the image synthesis section 202 synthesizes the high-order 12 bits of each pixel element (R, G, or B) (a total of 36 bits) and "0," and outputs the result. The signal outputted in this event is a signal having only the high-order bits (a normal gradation video signal).

The image display section 201 displays a video image on the basis of a signal outputted from the image synthesis section 202. Specifically, the image display section 201 reproduces a signal outputted from the image synthesis section 202, and displays a video image. The image display section 201 may be, for example, display devices such as a liquid crystal display (LCD), a plasma display panel (PDP), an organic electro-luminescence (EL) display, and a projector, and the like. Note that, although FIG. 2 shows an example in which the image display section 201 is incorporated in the receiver 20A, the image display section 201 may exist outside the receiver 20A.

3. CONCLUSIONS

As described hereinabove, according to the present embodiment, the frame generation apparatus 10 including the image division section 102, the frame generation section 103, and the transmission operation control section 106 is provided. Here, the image division section 102 divides a video signal into high-order bits and low-order bits for each pixel element. Further, the frame generation section 103 generates the first frame including the high-order bits and the second frame including the low-order bits. Then, in a case where the information regarding the receiver 20A is prescribed information, the transmission operation control section 106 causes the operation of the transmission section 105 of transmitting the second frame to the receiver 20A to stop.

By such a configuration, the operation of the transmission section 105 is stopped in the case where the information regarding the receiver 20A is prescribed information; thus, it becomes possible to reduce the power consumption required by the transmitter 10.

Further, according to the present embodiment, the image synthesis apparatus 20A including the pixel extraction section 203A, the image synthesis section 202, and the reception operation control section 206 is provided. Here, a case where the first frame and the second frame including, respectively, high-order bits and low-order bits that are obtained by a video signal to be received by the receiver 20A being divided for each pixel element are received from the transmitter 10 is envisaged. In such a case, the pixel extraction section 203A extracts the high-order bits and the low-order bits from the first frame and the second frame, respectively. Further, the image synthesis section 202 synthesizes the high-order bits and the low-order bits to restore the video signal. Then, in a case where the information regarding the receiver 20A is prescribed information, the reception operation control section 206 makes control so as to stop the operation of the reception section 205 of receiving the second frame from the transmitter 10.

By such a configuration, the operation of the reception section 205 is stopped in the case where the information regarding the receiver 20A is prescribed information; thus, it becomes possible to reduce the power consumption required by the receiver 20A.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above, the receiver 20A including both of the reception section 204 and the reception section 205 is described. Then, an example in which the pixel extraction section 203A extracts the high-order bits of each pixel element from the first frame received by the reception section 204 and extracts the low-order bits of each pixel element from the second frame received by the reception section 205, and the image synthesis section 202 synthesizes the high-order bits and the low-order bits to restore the video signal is described. However, the receiver 20A may not include the reception section 204, may not include the multiplexer 208, and may not have partial functions of the pixel extraction section 203A.

Figure 7:
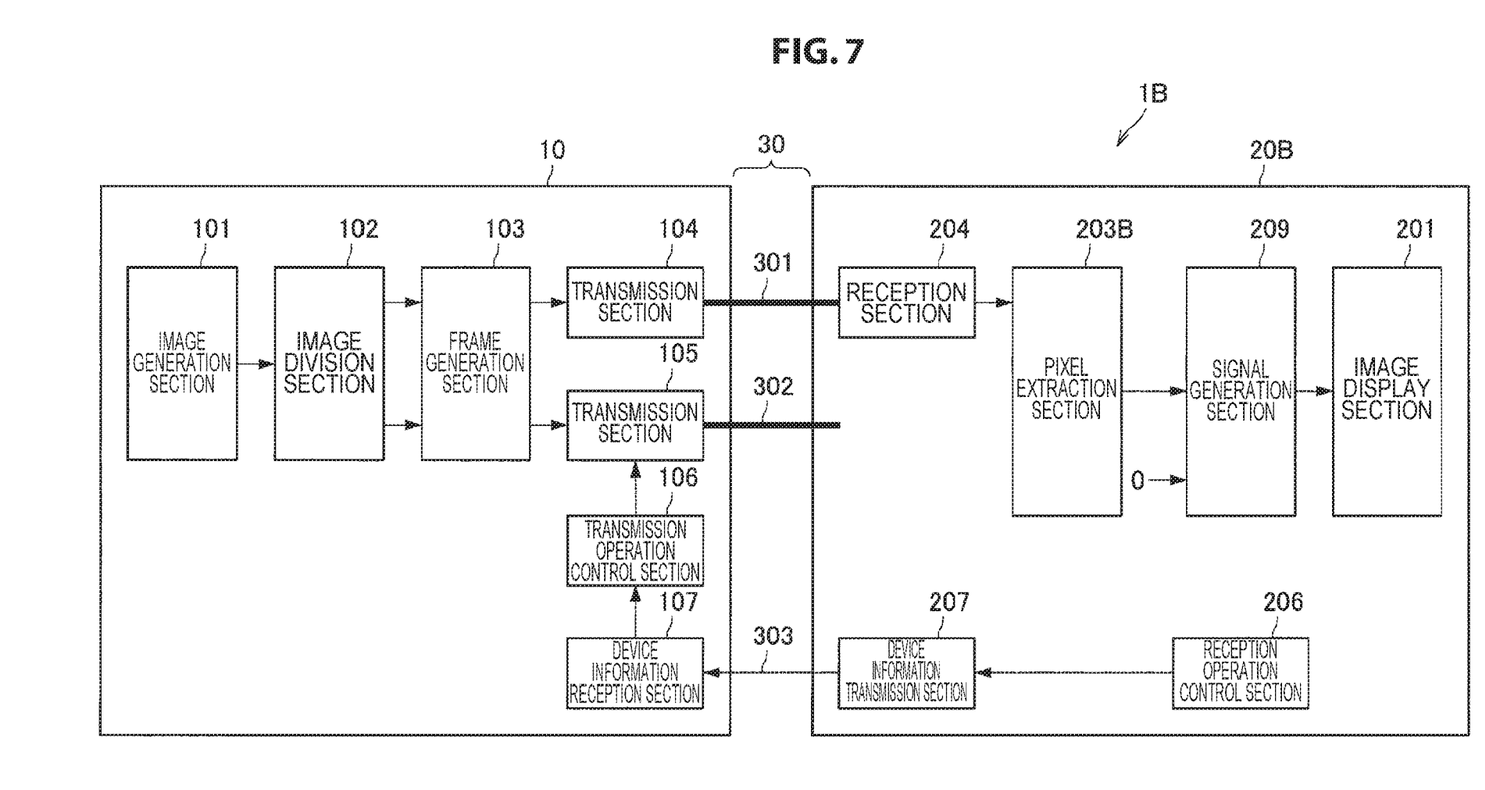
FIG. 7 is a diagram showing an example of a configuration of a modification example of the image transmission system.

FIG. 7 is a diagram showing an example of the configuration of a modification example of the image transmission system. As shown in FIG. 7, an image transmission system 1B according to the modification example includes a receiver 20B in place of the receiver 20A, and the receiver 20B does not include the reception section 205, includes a pixel extraction section 203B in place of the pixel extraction section 203A, and includes a signal generation section 209 in place of the image synthesis section 202. The receiver 20B can function as a "signal generation apparatus."

The pixel extraction section 203B extracts the high-order bits of each pixel element from the first frame, but the second frame is not inputted to the pixel extraction section 203B. The pixel extraction section 203B outputs "0" instead of the low-order bits of each pixel element to the signal generation section 209. The signal generation section 209 generates a video signal with a smaller size than the video signal Im10 on the basis of the high-order bits of each pixel element extracted by the pixel extraction section 203B.

In the receiver 20B, the reception section 205 does not exist, and furthermore the function of the pixel extraction section 203B is made smaller than the function of the pixel extraction section 203A; thus, a reduction in power consumption is achieved. Furthermore, the configuration of the receiver 20B is made simpler than the configuration of the receiver 20A; thus, the receiver 20B can be manufactured at a lower cost than the receiver 20A.

Further, for example, each of the image generation section 101, the image division section 102, the frame generation section 103, and the transmission operation control section 106 may be mounted on a separate integrated circuit (IC), or a combination of any two or more of these may be mounted on the same IC. Further, for example, each of the multiplexer 208, the reception operation control section 206, the pixel extraction section 203A (or the pixel extraction section 203B), and the image synthesis section 202 (or the signal generation section 209) may be mounted on a separate IC, or a combination of any two or more of these may be mounted on the same IC.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A frame generation apparatus including: an image division section configured to divide a video signal into high-order bits and low-order bits for each pixel element;

a frame generation section configured to generate a first frame including the high-order bits and a second frame including the low-order bits; and a transmission operation control section configured to cause an operation of a transmission section of transmitting the second frame to a receiver to stop in a case where information regarding the receiver is prescribed information.

(2)

The frame generation apparatus according to (1), in which the information regarding the receiver includes at least either one of a state of the receiver and a function of the receiver.

(3)

The frame generation apparatus according to (2), in which the information regarding the receiver includes a state of the receiver, and the transmission operation control section causes the operation of the transmission section of transmitting the second frame to stop in a case where the state of the receiver is a prescribed state.

(4)

The frame generation apparatus according to (2), in which the information regarding the receiver includes a function of the receiver, and the transmission operation control section causes the operation of the transmission section of transmitting the second frame to stop in a case where the function of the receiver is a prescribed function.

(5)

The frame generation apparatus according to any one of (1) to (4), in which the transmission operation control section controls the frame generation section so as to stop generation of the second frame in the case where the information regarding the receiver is the prescribed information.

(6)

The frame generation apparatus according to any one of (1) to (5), including: a device information reception section configured to receive the information regarding the receiver from the receiver.

(7)

The frame generation apparatus according to any one of (1) to (6), in which the frame generation section marks a frame start identifier on a head of each of the first frame and the second frame.

(8)

The frame generation apparatus according to any one of (1) to (7), including:

a first transmission section configured to transmit the first frame; and a second transmission section configured to transmit the second frame.

(9)

A frame generation method including:

dividing a video signal into high-order bits and low-order bits for each pixel element;

generating a first frame including the high-order bits and a second frame including the low-order bits; and causing an operation of a transmission section of transmitting the second frame to a receiver to stop in a case where information regarding the receiver is prescribed information.

(10)

An image synthesis apparatus including:

a pixel extraction section configured to extract high-order bits and low-order bits from, respectively, a first frame and a second frame including, respectively, the high-order bits and the low-order bits that are obtained by a video signal to be received by a receiver being divided for each pixel element in a case where the first frame and the second frame are received from a transmitter;

an image synthesis section configured to synthesize the high-order bits and the low-order bits to restore the video signal; and a reception operation control section configured to make control so as to stop an operation of a reception section of receiving the second frame from the transmitter in a case where information regarding the receiver is prescribed information.

(11)

The image synthesis apparatus according to (10), in which the information regarding the receiver includes at least either one of a state of the receiver and a function of the receiver.

(12)

The image synthesis apparatus according to (11), in which the information regarding the receiver includes a state of the receiver, and the reception operation control section causes the operation of the reception section of receiving the second frame to stop in a case where the state of the receiver is a prescribed state.

(13)

The image synthesis apparatus according to (11), in which the information regarding the receiver includes a function of the receiver, and the reception operation control section causes the operation of the reception section of receiving the second frame to stop in a case where the function of the receiver is a prescribed function.

(14)

The image synthesis apparatus according to any one of (10) to (13), in which the reception operation control section controls the pixel extraction section so as to stop extraction of the high-order bits and the low-order bits in the case where the information regarding the receiver is the prescribed information.

(15)

The image synthesis apparatus according to any one of (10) to (14), including:

a device information transmission section configured to transmit the information regarding the receiver to the transmitter.

(16)

The image synthesis apparatus according to any one of (10) to (15), in which the pixel extraction section extracts the high-order bits and the low-order bits on a basis of positions of frame start identifiers marked on heads of the first frame and the second frame, respectively.

(17)

The image synthesis apparatus according to any one of (10) to (16), including:

a second reception section configured to receive the first frame; and a second reception section configured to receive the second frame.

(18)

An image synthesis method including:

extracting high-order bits and low-order bits from, respectively, a first frame and a second frame including, respectively, the high-order bits and the low-order bits that are obtained by a video signal to be received by a receiver being divided for each pixel element in a case where the first frame and the second frame are received from a transmitter;

an image synthesis section configured to synthesize the high-order bits and the low-order bits to restore the video signal; and making control so as to stop an operation of a reception section of receiving the second frame from the transmitter in a case where information regarding the receiver is prescribed information.

(19)

A signal generation apparatus including:

a pixel extraction section configured to extract high-order bits from a first frame including the high-order bits that are obtained by a video signal to be received by a receiver being divided for each pixel element in a case where the first frame is received from a transmitter; and a signal generation section configured to generate a video signal with a smaller size than the video signal on a basis of the high-order bits.

(20)

An image transmission system including:

a frame generation apparatus including an image division section configured to divide a video signal into high-order bits and low-order bits for each pixel element, a frame generation section configured to generate a first frame including the high-order bits and a second frame including the low-order bits, and a transmission operation control section configured to cause an operation of a transmission section of transmitting the second frame to a receiver to stop in a case where information regarding the receiver is prescribed information; and an image synthesis apparatus including a pixel extraction section configured to extract the high-order bits and the low-order bits from the first frame and the second frame, respectively, in a case where the first frame and the second frame are received from a transmitter, an image synthesis section configured to synthesize the high-order bits and the low-order bits to restore the video signal, and a reception operation control section configured to make control so as to stop an operation of a reception section of receiving the second frame from the transmitter in a case where information regarding the receiver is prescribed information.

REFERENCE SIGNS LIST 1A, 1B image transmission system
10 transmitter (frame generation apparatus)
20A receiver (image synthesis apparatus)
20B receiver (signal generation apparatus)
101 image generation section
102 image division section
103 frame generation section
104 transmission section
105 transmission section
106 transmission operation control section
107 device information reception section
201 image display section
202 image synthesis section
203A, 203B pixel extraction section
204 reception section
205 reception section
206 reception operation control section
207 device information transmission section
208 multiplexer
209 signal generation section
30 cable
301 transmission path
302 transmission path
303 transmission path
Im10 video signal

The invention claimed is:

1. A frame generation apparatus, comprising:

a processor configured to:
divide a video signal into high-order bits and low-order bits for each pixel element;
generate a first frame including the high-order bits and a second frame including the low-order bits; and
control a transmission of the second frame to a receiver to stop in a case where prescribed information regarding the receiver indicates that one of:
the receiver lacks capability to process a gradation video signal including both the high-order bits and the low-order bits, or
a number of bits receivable by the receiver is below a threshold.

2. The frame generation apparatus according to claim 1, wherein the prescribed information regarding the receiver further includes at least one of a state of the receiver or a function of the receiver.

3. The frame generation apparatus according to claim 2, wherein the processor is further configured to cause the transmission of the second frame to stop in a case where the state of the receiver is a prescribed state.

4. The frame generation apparatus according to claim 2, wherein the processor is further configured to cause the transmission of the second frame to stop in a case where the function of the receiver is a prescribed function.

5. The frame generation apparatus according to claim 1, wherein the processor is further configured to control generation of the second frame to stop in the case where the prescribed information regarding the receiver is received.

6. The frame generation apparatus according to claim 1, wherein the processor is further configured to receive the prescribed information regarding the receiver from the receiver.

7. The frame generation apparatus according to claim 1, wherein the processor is further configured to mark a frame start identifier on a head of each of the first frame and the second frame.

8. The frame generation apparatus according to claim 1, wherein the processor is further configured to transmit the first frame.

9. A frame generation method, comprising:
dividing a video signal into high-order bits and low-order bits for each pixel element;
generating a first frame including the high-order bits and a second frame including the low-order bits; and
controlling a transmission of the second frame to a receiver to stop in a case where prescribed information regarding the receiver indicates that one of:
the receiver lacks capability to process a gradation video signal including both the high-order bits and the low-order bits, or
a number of bits receivable by the receiver is below a threshold.

10. An image synthesis apparatus, comprising:
a processor configured to:
extract high-order bits from a first frame and low-order bits from a second frame, wherein the high-order bits and the low-order bits are obtained by division of a video signal to be received by a receiver for each pixel element, and the first frame and the second frame are received from a transmitter;
synthesize the high-order bits and the low-order bits to restore the video signal; and
control reception of the second frame from the transmitter to stop in a case where prescribed information regarding the receiver indicates that one of:
the receiver lacks capability to process a gradation video signal including both the high-order bits and the low-order bits, or
a number of bits receivable by the receiver is below a threshold.

11. The image synthesis apparatus according to claim 10, wherein the prescribed information regarding the receiver includes at least one of a state of the receiver or a function of the receiver.

12. The image synthesis apparatus according to claim 11, wherein the processor is further configured to cause the reception of the second frame to stop in a case where the state of the receiver is a prescribed state.

13. The image synthesis apparatus according to claim 11, wherein the processor is further configured to cause the reception of the second frame to stop in a case where the function of the receiver is a prescribed function.

14. The image synthesis apparatus according to claim 10, wherein the processor is further configured to stop extraction of the high-order bits and the low-order bits in the case where the prescribed information regarding the receiver is received.

15. The image synthesis apparatus according to claim 10, wherein the processor is further configured to transmit the prescribed information regarding the receiver to the transmitter.

16. The image synthesis apparatus according to claim 10, wherein the processor is further configured to extract the high-order bits and the low-order bits based on positions of frame start identifiers marked on heads of the first frame and the second frame, respectively.

17. The image synthesis apparatus according to claim 10, wherein the processor is further configured to receive the first frame.

18. An image synthesis method, comprising:
extracting high-order bits from a first frame and low-order bits from a second frame, wherein the high-order bits and the low-order bits are obtained by division of a video signal to be received by a receiver for each pixel element, and the first frame and the second frame are received from a transmitter;
synthesizing the high-order bits and the low-order bits to restore the video signal; and
controlling reception of the second frame from the transmitter to stop in a case where prescribed information regarding the receiver indicates that one of:
the receiver lacks capability to process a gradation video signal including both the high-order bits and the low-order bits, or
a number of bits receivable by the receiver is below a threshold.

19. A signal generation apparatus, comprising:
a processor configured to:
extract high-order bits from a first frame, wherein the high-order bits are obtained by division of a first video signal to be received by a receiver for each pixel element, and the first frame is received from a transmitter, wherein a second frame of:
the first video signal that includes low-order bits is not received in a case where prescribed information regarding the receiver indicates that one of the receiver lacks capability to process a gradation video signal including both the high-order bits and the low-order bits, or
a number of bits receivable by the receiver is below a threshold; and
generate a second video signal with a smaller size than the first video signal based on the high-order bits.

20. An image transmission system, comprising:
a frame generation apparatus including a first processor configured to:
divide a video signal into high-order bits and low-order bits for each pixel element;
generate a first frame including the high-order bits and a second frame including the low-order bits; and
control transmission of the second frame to a receiver to stop in a case where prescribed information regarding the receiver indicates that one of:
the receiver lacks capability to process a gradation video signal including both the high-order bits and the low-order bits, or
a number of bits receivable by the receiver is below a threshold; and
an image synthesis apparatus including a second processor configured to:
extract the high-order bits from the first frame and the low-order bits from the second frame, wherein the first frame and the second frame are received from a transmitter;

synthesize the high-order bits and the low-order bits to restore the video signal; and
control reception of the second frame from the transmitter in the case where the prescribed information regarding the receiver indicates that one of:
the receiver lacks the capability to process the gradation video signal including both the high-order bits and the low-order bits, or
the number of bits receivable by the receiver is below the threshold.

* * * * *